United States Patent
Lehr et al.

(10) Patent No.: US 8,955,708 B2
(45) Date of Patent: Feb. 17, 2015

(54) INSULATING CONTAINER AND METHODS OF MAKING AN INSULATING CONTAINER

(71) Applicant: Interface Solutions, Inc., Lancaster, PA (US)

(72) Inventors: Brian C. Lehr, Lancaster, PA (US); Jeffery L. Barrall, Lititz, PA (US)

(73) Assignee: Interface Solutions, Inc., Lancaster, PA (US)

( * ) Notice: Subject to any disclaimer, the term of this patent is extended or adjusted under 35 U.S.C. 154(b) by 0 days.

(21) Appl. No.: 14/212,265

(22) Filed: Mar. 14, 2014

(65) Prior Publication Data

US 2014/0263369 A1 Sep. 18, 2014

Related U.S. Application Data

(60) Provisional application No. 61/789,267, filed on Mar. 15, 2013.

(51) Int. Cl.
*B65D 81/38* (2006.01)
*B65D 81/113* (2006.01)

(52) U.S. Cl.
CPC .......... *B65D 81/3823* (2013.01); *B65D 81/113* (2013.01); *B65D 81/3813* (2013.01)
USPC ................................... 220/592.26; 220/592.2

(58) Field of Classification Search
CPC ..... F25D 23/063; F25D 23/062; F25D 23/06; F25D 23/066; F25D 23/065; F25D 2201/10; F25D 2201/00; B65D 81/3813; B65D 81/38; B65D 1/24; B65D 5/48024; B65D 5/48; B65D 25/04; B65D 25/08; B65D 5/566; B65D 81/022; B65D 81/03; B65D 81/107; B65D 81/113; B65D 85/30

USPC ........... 220/592.2, 592.05, 592.01, 4.21, 529, 220/4.23, 4.22, 3.8, 3.92, 3.94, 4.02, 220/592.25, 592.26, 919; 206/523, 524, 206/590, 588, 592; 174/50.5, 559, 520; 29/463

See application file for complete search history.

(56) References Cited

U.S. PATENT DOCUMENTS 3,104,984 A 9/1963 Reck et al.
3,181,693 A * 5/1965 Freistat .................... 206/523

(Continued)

FOREIGN PATENT DOCUMENTS

FR 2527544 A1 12/1983
JP 5275114 A 10/1993

(Continued)

OTHER PUBLICATIONS

International Search Report and Written Opinion for PCT/US2014/028712, Jul. 11, 2014.

*Primary Examiner* — Robert J Hicks
(74) *Attorney, Agent, or Firm* — Womble Carlyle Sandridge & Rice, LLP

(57) ABSTRACT

An insulating container for controlling the transfer of heat from a hot object contained therein, the insulating container including a first half-shell and a second half-shell configured to couple together to form a sealed enclosure. The container further includes a first insert and a second insert sized and shaped to be received within the first half shell and the second half shell, respectively, and having inner surfaces that are shaped to surround and substantially conform to the hot object enclosed within the sealed enclosure, and wherein the first insert and the second insert are built up from a plurality of planar pieces of insulating material.

20 Claims, 5 Drawing Sheets

(56) References Cited

U.S. PATENT DOCUMENTS

2013/0068776 A1* 3/2013 Patterson ................. 220/592.01
2013/0075408 A1* 3/2013 Childress et al. ........ 220/560.01

FOREIGN PATENT DOCUMENTS

| JP | 2010116210 | 5/2010 |
| KR | 1187880 B1 | 10/2012 |

* cited by examiner

INSULATING CONTAINER AND METHODS OF MAKING AN INSULATING CONTAINER

RELATED APPLICATIONS

This patent application claims the benefit of U.S. Provisional Patent Application No. 61/789,267, filed on Mar. 15, 2013, and entitled "insulating Container and Method of Making an Insulating Container", which application is incorporated by reference in its entirety herein.

TECHNICAL FIELD

This disclosure relates generally to insulating containers for containing and controlling the heat transfer from a hot object that is contained therein, and in one embodiment to an insulating container for containing and controlling the heat transfer from a fuel cell that is actively generating electricity.

BACKGROUND

In recent years, portable fuel cell power systems have received consideration as replacements or alternatives to the battery power systems currently utilized on industrial electric vehicles and panel trucks. One exemplary industrial sector where the portable and self-contained fuel cell power systems have proven useful involves panel trucks that require an additional source of electrical power in addition to the electrical power that may be supplied from an alternator or generator running off the internal combustion engine. When the engine is not running, the alternative source of electricity can be used to power electronic devices and/or motors which drive the mechanical, hydraulic, or pneumatic systems which are also carried on the truck.

Another sector where portable fuel cell power systems have made significant progress is within the specialized industrial electric trucks and vehicles market that includes fork trucks, tractors, platform lift trucks, hand trucks, and floor cleaners, etc. These specialize trucks are typically used for materials handling and site maintenance in indoor warehouses, processing and manufacturing facilities, and other areas which must comply with emissions regulations and fire safety standards. In contrast to their battery-powered predecessors, fuel cell-powered industrial trucks do not require down time and floor space for recharging, and are generally available for operation 24 hours a day, 7 days a week. Thus, in switching from a battery-based system to a fuel cell-based system, the user may be able to save time and floor space, as well as reduce the number of specialized industrial electric trucks required to operate his business safely and efficiently.

Portable and self-contained fuel cell power systems generally include a reservoir where the fuel is stored, and one or more fuel cells arranged in a fuel cell stack that convert the chemical energy in the fuel into electricity in an electrochemical process. In doing so, however, the fuel call may also produce a generous amount of heat, and it is common for the temperatures of the outer surfaces of the fuel cell to range from 300° C. to 750° C. The preferred fuel is generally some form of hydrogen that may be stored in either a gaseous state or in a liquid state (e.g. methanol), while the non-electrical by-products of the electrochemical process are primarily the waste heat and water vapor, with possible additional non-volatile gases included with the water vapor, depending on the type of fuel. While the water vapor (and other gases) is usually released into the surrounding environment, the waste heat from the fuel cell must be controlled to prevent hot spots that could damage adjacent equipment and structures, or that could inadvertently initiate combustion if operated near a combustible material or gas. This is typically accomplished through the use of a sealed container that houses a body of insulting material that surrounds and conforms to the irregular shape of the fuel cell, and that redistributes the heat as it flows from the outer surface of the fuel cell, through the insulating material, and eventually to the outer surface of the container where it is dissipated into the surrounding environment. The insulating material is generally configured to redistribute the waste heat more evenly across the outer surface area of the container and to reduce the intensity of any hot spots on the outer surface of the container.

In current fuel cell containers, the body of insulating material is generally machined from a solid block of insulating material to match the irregular profile of the fuel cell and to provide the greatest amount of heat redistribution in the smallest possible space, given the size and spacing limitations in typical vehicle applications. However, both the "machineable" insulation material and the machining process can be expensive and the consuming, which often results in a more expensive portable power system having longer delivery times. Consequently, a need exists for a more affordable, cost-effective, and easily-manufactured insulating container for an active fuel cell that may be used in a vehicular application, and which effectively controls the heat transfer through the container to avoid hot spots on the outside of the container. It is toward such an insulating container that the present disclosure is directed.

SUMMARY

Briefly described, one embodiment of the present disclosure comprise an insulating container for controlling the transfer of heat from a hot object contained therein. The insulating container includes a first half-shell and a second half-shell that are configured to couple together to form a sealed enclosure. The container further includes a first insert and a second insert sized and shaped to be received within the first half shell and the second half shell, respectively. with both the first insert and the second insert having inner surfaces that are shaped to surround and substantially conform to the hot object enclosed within the sealed enclosure. In addition, both the first insert and the second insert are built up from a plurality of planar pieces of insulating material Another embodiment of the disclosure comprises a method of making an insulating container for controlling the transfer of heat from a hot object contained therein. The method includes obtaining a first half-shell and a second half-shell, obtaining a substantially planar sheet of insulating material, and cutting or forming a plurality of planar pieces from the substantially planar sheet of insulating material, with each of the planar pieces having an outer edge sized and shaped to fit within one of the first half shell and the second half shell, and with some of the planar pieces including inner edges. The method also includes building up the plurality of planar pieces to form a first insert and a second insert that are sized and shaped to be received within the first half-shell and the second half shell, respectively, and with both the first insert and the second insert having inner surfaces defined by the plurality of inner edges and shaped to substantially conform around the hot object. The method further includes installing the first insert within the first half-shell, installing the second insert within the second half-shell, and coupling together the first half-shell and the second half-shell to form a sealed enclosure configured to surround and substantially conform to the hot object enclosed within the sealed enclosure.

The invention will be better understood upon review of the detailed description set forth below taken in conjunction with the accompanying drawing figures, which are briefly described as follows.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Figure 1:
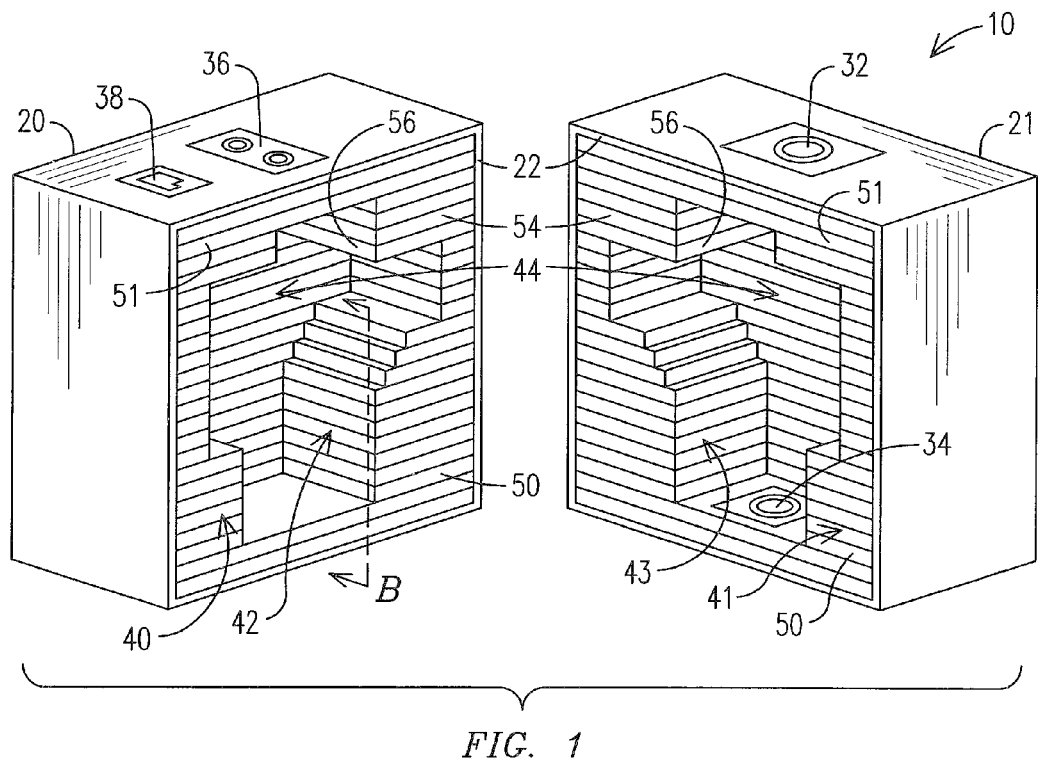
FIG. 1 is a perspective side view of an insulating container that includes two exterior half-shells with inserts formed from a plurality of built-up planar pieces, in accordance with a representative embodiment of the present disclosure.

Referring now in more detail to the drawing figures, wherein like parts are identified with like reference numerals throughout the several views, FIG. 1 illustrates a representative embodiment of an insulating container 10 that is configured to control the transfer of heat from a hot object that is contained therein, such as a fuel cell that is actively generating electricity. The insulating container generally includes two half-shells 20, 21 filled by two inserts 40, 41, respectively. Both of the inserts 40, 41 have inner surfaces 42, 43, respectively, that are shaped to match the outer contours of the hot object that will be enclosed within the container, so that the inner surfaces 42, 43 together form an inner cavity 44 that surrounds and substantially conforms to the hot object when the half-shells 20, 21 are coupled together along a seam 22. As the outer contours of the hot object may have an irregular shape, the inner surfaces 42 43 may be irregular in shape and may not be symmetric on both sides of the seam 22.

As shown in FIG. 1, the inserts 40, 41 may be built up from a plurality of substantially planar pieces 50 of insulating material 51. In one aspect, each of the planar pieces 50 forming the built-up inserts 40, 41 can be die cut from one or more substantially planar sheets of insulating material 51. Once cut, each planar piece 50 generally includes a perimeter or outer edge that is sized and shaped to contact the inside face of the half-shells 20 21, and a side edge 54 that contacts, along the seam 22, the side edge of a complimentary planar piece included within the opposing insert.

In addition, many of the planar pieces 50 also have an inner edge 56 that opens into one side of the inner cavity 44 to define a portion of one of the inner surfaces 42, 43. Each of the planar pieces 50 can also have a top surface and a bottom surface, although the designations of "top" and "bottom" are arbitrary and may apply only to the embodiment of the insulating container 10 illustrated in FIG. 1. As discussed in more detail below with reference to FIGS. 9 and 10, the plurality of planar pieces forming the inserts may also be oriented vertically and built-up or stacked from end-to-end or side-to-side, rather than from bottom-to-top, as shown in FIG. 1.

The insulating material 51 that forms the planar pieces 50 can be made from a variety of mixtures and through a variety of processes that result in free-standing planar pieces 50 having sufficient rigidity and stiffness to maintain their shape when isolated from the other pieces. For example, in one representative embodiment the insulation material 51 can comprise a mixture of ceramic fibers, clay, inert fillers, and organic and/or inorganic binder components similar to those used to make a heat and flame resistant millboard, such as industry-standard 1401 millboard. Moreover, the insulating material 51 may be initially mixed as a pulp or fiber-based slurry that is rolled, pressed, molded, or otherwise formed into the substantially planar sheet as it is de-watered and dried into its final form having a stiffness and rigidity that maintains its free-standing shape.

As further shown in FIG. 1, the container 10 may also include interface connectors, fittings or ports that allow for various inputs and outputs to be connected to the hot object through the half-shells 20, 21 and insulating inserts 40, 41. In the exemplary case of an active fuel cell, for instance, the container 10 may include an inlet port 32 that establishes fluid communication between the fuel cell and a source of a hydrogen-based fuel, as well as an outlet port 34 or drain that allows for the discharge of the by-products of the electrochemical reaction, such as water and non-volatile gases. The container 10 may also include electrical terminals 36 for distributing the electricity produced by the fuel cell during active generation, and well as wiring or cabling 38 for controlling and/or monitoring the operation of the fuel cell.

It is to be appreciated that the irregular shape and structure of the inner cavity 44 illustrated in FIG. 1 is merely a simplistic representation of an inner cavity for enclosing and conforming to a hot object having an irregular shape and structure, and is not to be considered limiting in shape or form in any way. Indeed, additional shapes for the inner cavity 44 that include rounded corners and curved surfaces, indentations for receiving additional structures projecting outwardly from the hot object, and different locations for the interface connectors, fittings or ports, etc., are both expected and to be considered to fall within the scope of the present disclosure.

Figure 2:
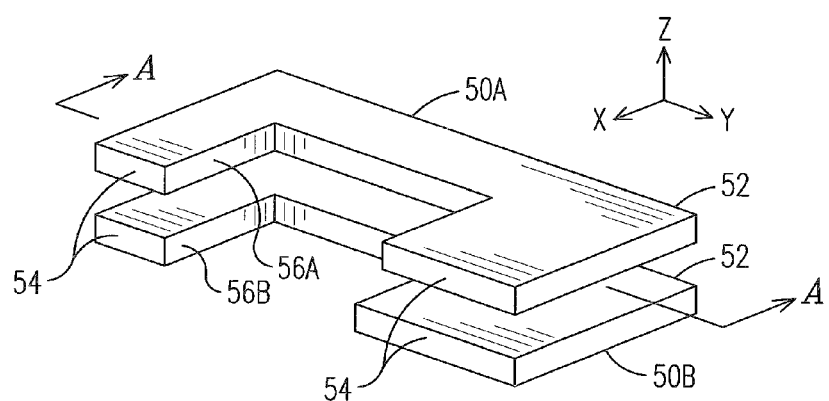
FIG. 2 is a perspective side view of two of the planar pieces of FIG. 1.

FIG. 2 is an exploded perspective view of two of the planar pieces 50A, 50B of FIG. 1, with each piece having a perimeter or outer edge 52, side edges 54, an inner edges 56A, 56B, and a top surface 58 and a bottom surface 59. The inner edges 56A, 56B generally open from the side edges 54 to provide the planar pieces 50A, 50B, when viewed from the top or bottom, with a channel-shaped profile. In the illustrated embodiment, moreover, each of the planar pieces 50A, 50B is substantially planar in cross-section along two orthogonal axes (such as the x axis and y axis shown in the drawing) and has a substantially constant thickness ranging from about ⅛ inch to about ½ inch. Nevertheless, planar pieces having a thickness less than ⅛ inch or greater than ½ inch are also possible and considered to fall within the scope of he present disclosure.

In another aspect of the present disclosure, the pieces of insulating material used to build up the inserts may not be substantially planar, and may instead be curved out of the plane defined by the orthogonal x-y axes (i.e. in the z direction). In yet another aspect, the pieces may not have a substantially constant thickness, and instead may vary in thickness along either or both of the two orthogonal x-y axes. These and other variations in the geometry of the individual pieces of insulating material are also contemplated and considered to fall within the scope of the present disclosure.

Figure 3A:
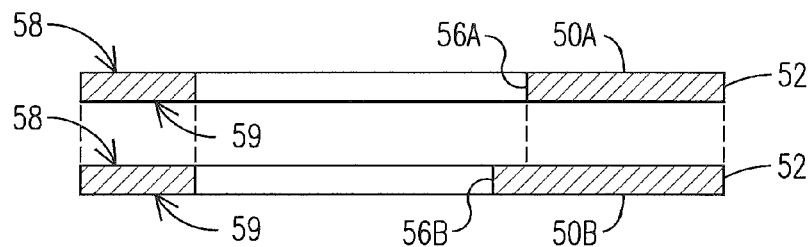
FIGS. 3A-3B are cross-sectional side views of the two planar pieces of FIG. 2 as viewed from Section Line A-A, in accordance with additional representative embodiments.

FIG. 3A is a cross-sectional side view of the two planar pieces 50A, 50B of FIG. 2, as viewed from Section Line A-A. As can be seen, both of the inner edges 56A, 56B are cut or formed substantially perpendicular to the top surfaces 58 and the bottom surfaces 59, with the inner edge 56A of planar piece 50A being cut further outward from the inner edge 56B of adjacent planar piece 50B. In one aspect, all of the edges of the planar pieces, including the inner edges 56A, 56B, can be cut with the edges of a die as it presses through the substantially planar sheet of insulating material described above. In other aspects, the edges of the planar pieces can be cut with a industrial knife or blade. a machine tool, a water jet, an infrared or visible laser, or with any similar industrial cutting instrument.

When the two planar pieces 50A, 50B are assembled together the insert, the inner edges 56A, 56B together define an inner surface having a stepped contour. Thus, when the plurality of the planar pieces 50 are assembled together to form a complete insert, with many of the planar pieces having perpendicular and staggered inner edges, the inner surface of the insert can have a stepped contour that substantially matches, although not exactly, the contours of the hot object.

In general, the degree of conformity of the insert with the hot object is inversely proportional with the thickness of the planar pieces 50, with planar pieces having a smaller thickness being able to more precisely match and provide a greater degree of conformity with the contours of the hot object than planar pieces having a greater thickness. Although not shown, it is to be appreciated that while each planar piece 50 may have a constant thickness, that the thickness between planar pieces 50 may vary in the direction that the planar pieces are stacked one upon the other. For example, as shown in FIG. 1, thinner planar pieces may be utilized in locations where the Inner surfaces 42 of the cavity 44 are highly curved, and thicker planar pieces may be utilized in locations where the inner surfaces 42 are generally straight or less curved.

Figure 3B:
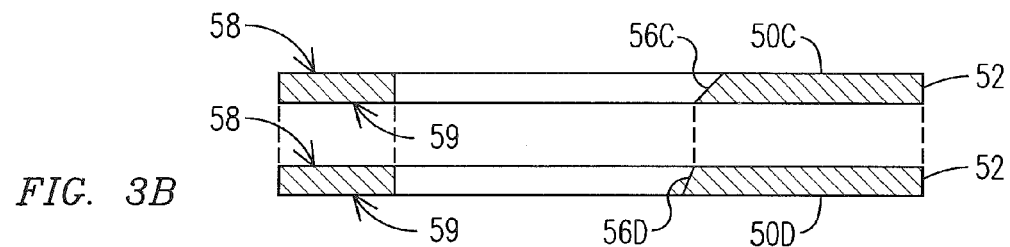

In accordance with another representative embodiment of the present disclosure, FIG. 3B is a cross-sectional side view of two planar pieces 50C, 50D that are similar to those shown in FIG. 3A, but with inner edges 56C, 56D that have been cut or formed at angles that are non-perpendicular relative to the top surfaces 58 and the bottom surfaces 59 of the planar pieces 50C 50D. The angled inner edges 56C, 56D may or may not be cut at the same angle, although the leading and trailing corners of the angled inner edges can be configured to align together when assembled to avoid a stepped contour and to instead form a facetted contour. Thus, in the embodiment of FIG. 3B, the inner surface of the completely assembled insert can have a facetted contour that also substantially matches, although not exactly, the contours of the hot object. As with the stepped embodiment discussed above, the degree of conformity is generally inversely proportional with the thickness of the planar pieces, with planar pieces having a smaller thickness being able to more precisely match and provide a greater degree of conformity with the contours of the hot object than planar pieces have a greater thickness. Regardless of the angles of the inner edges, the outer edges 52 and side edges of the planar pieces 50C, 50D can still be cut or formed in a substantially perpendicular fashion to provide the insert with a substantially smooth outer surface that interfaces with the half-shell, or a smooth side surface that allows for close coupling with the side surfaces of the opposing insert.

In one aspect, all of the planar pieces 50 forming the insert 40 can be formed from a basic insulating material 51 that will generally be a high-performance but easily-manufactured and cost-effective insulator which is suitable for most applications. Both the low cost of the insulating material 51 and the built-up construction on the inserts 40, 41 forming the custom-shaped cavity 44 can result in an insulating container 10 that is less expensive than current container systems that utilize custom-machined inserts.

Figure 4:
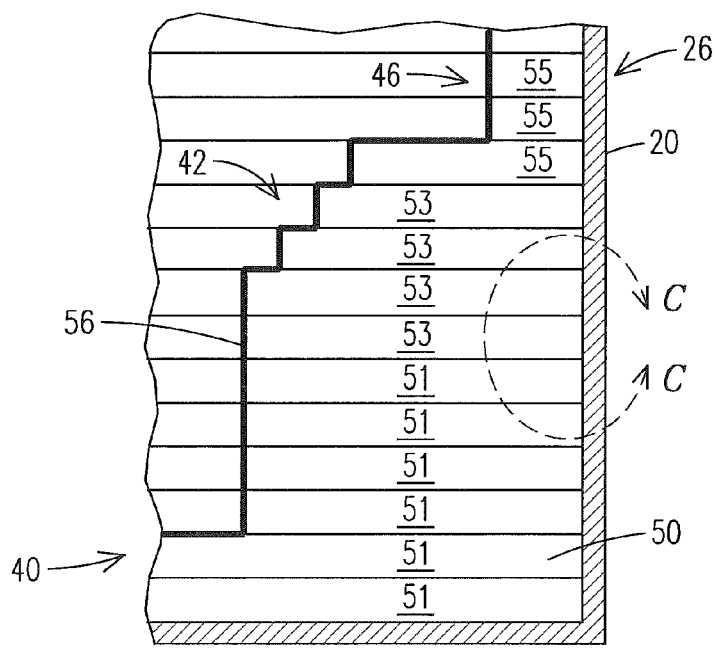
FIG. 4 is a partial cross-sectional side view of one of he half-shells of FIG. 1, as viewed from Section Line B-B of FIG. 1.

On occasion, however, size constraints on the overall container in combination with the exterior dimensions of the hot object may require that the thickness of the insert 40 be reduced below preferred values in certain sections 46 of the insert 40, as shown in the partial cross-sectional side view of one of the half-shells 20 provided in FIG. 4. Unless addressed, this can lead to an increased flow of heat from the hot object in those sections 46, with the formation of an undesirable hot spot on the outer surface 26 of the half shell 20. In these circumstances, planar pieces 50 formed from a very high performance insulating material 53 and/or from an ultra high performance insulating material 55 having greater insulating values, but that also may be more expensive or otherwise more difficult to obtain, may be incorporated into those sections 46 of the insert having a limited thickness. This feature allows for the material properties of the insulating insert 40 to be varied throughout one or more dimensions of the insert as needed to maintain the overall thermal performance of the container while preserving a lower cost by continuing to use the basic material 51 for the bulk of the planar substrates.

In one aspect, the planar pieces 50 can be stacked one on top the other during assembly of the insert 40 without an adhesive, with the bottom surfaces 59 of the upper pieces 50 directly contacting the top surfaces 58 of the planar pieces positioned immediately below. In this case, the assembled insert 40 can be held together by the structure of the half-shell 20, by an alignment dowel or post, or by some other mechanical attachment or alignment means. In other aspects, however, the planar pieces 50 can be coupled together with an adhesive prior to the installation of the insert 40 within a half shell 20. For example, FIGS. 5A-5B are close-up cross-sectional side views of the outer edges of the planar pieces 50 and a portion of the half-shell 20, as taken from Section C-C of FIG. 4, and in accordance with additional representative embodiments of the present disclosure.

Figure 5A:
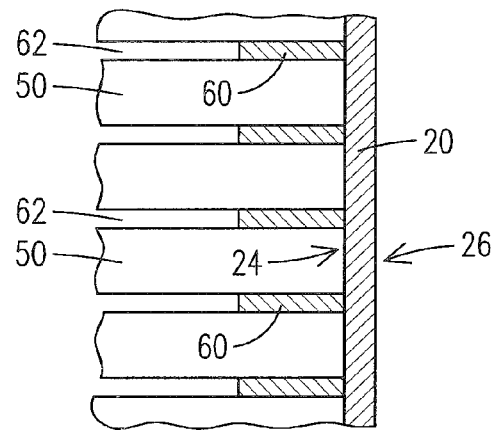
FIGS. 5A-5B are close-up cross-sectional side views of the outer edges of the insulating layers, in accordance with additional representative embodiments.

Referring first to FIG. 5A, the planar pieces 50 can be coupled together with one or more adhesive strips 60 positioned proximate the outer edges of the planar pieces 50 and adjacent the inside surface 24 of the half shell 20. The adhesive strips 60 can be applied in the form of a high-temperature adhesive tape, a cured high-temperature adhesive fluid, and the like, and in one aspect can be a silicate adhesive which quickly dries to form the perimeter bond. In addition, the adhesive strips 60 may have sufficient stiffness and rigidity to separate the inner portions of the planar pieces 50 to form air gaps 62 between each of the planar pieces 50. In one aspect, the air gaps 62 may be sized or configured to laterally redistribute heat with each layered portion of the insert 40, as the heat may more readily flow around the hot object from a hot portion of the insert to a cooler portion of the insert via convection of the air within the air gaps.

In configurations where the planar pieces 50 of insulating material are both oriented horizontally, as shown in FIG. 1, and separated by air gaps 62, as shown in FIG. 5A, additional support strips or blanks (not shown) having a thickness approximately equal to the thickness of the air gaps 62 may be positioned to span the air gaps directly underneath the hot object. The support strips can be configured to support and transfer the weight of the hot object directly downward to the base of the container, rather than require the planar piece immediately below the object to bear the weight of the hot object without bending or cracking and breaking. The support strips or blanks may also be formed from the adhesive, or from the insulating material, or from some other rigid material.

Figure 5B:
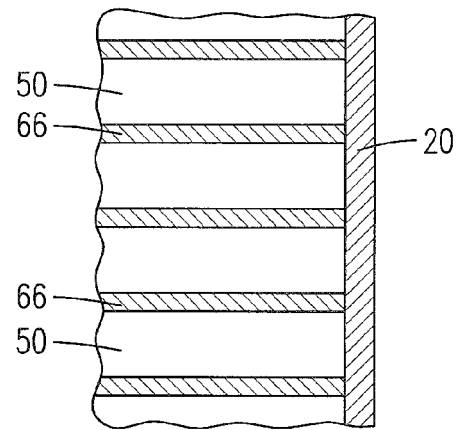

In another embodiment illustrated in FIG. 5B, the planar pieces 50 may also be coupled together with a high-temperature adhesive layer 66 that can be substantially continuous across the full extent of the upper surfaces and lower surfaces of the planar pieces. The adhesive layer 66 may comprise a thin layer of liquid which is subsequently dried and cured to bond the planar pieces together, an adhesive film, and the like.

Figure 6:
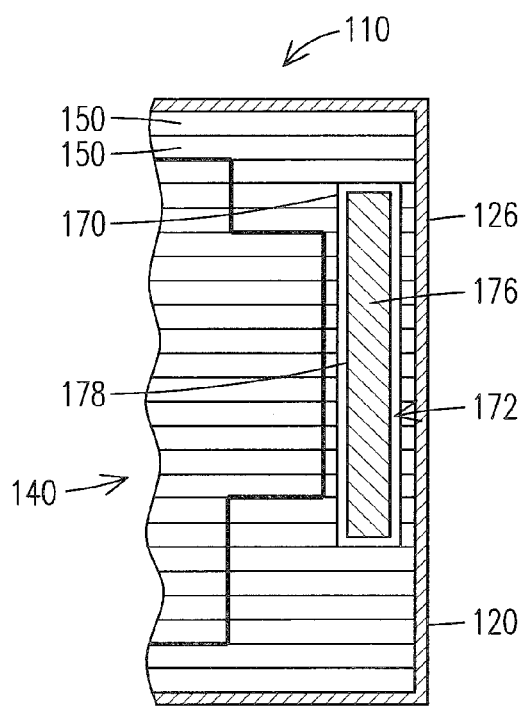
FIG. 6 is a partial cross-sectional side view of one of the half-shells, in accordance with another representative embodiment.

In accordance with another representative embodiment, FIG. 6 is partial cross-sectional side view of an insert 140 and half-shell 120 of a container 110 in which apertures 170 have been formed into two or more planar pieces 150 and aligned together to form a pocket cavity 172 that is sized and shaped to receive a secondary insulating body 176. In one aspect, the secondary insulating body 176 can comprise an insulating material having a very high or ultra-high R value (i.e. a measure of thermal resistance), such as an aerogel. The pocket cavity 172 and secondary insulating body 176 may also be located in a region 146 of the insert 140 that is more susceptible to an increased flow of heat that would otherwise lead to the formation of an undesirable hot spot on the outer surface 126 of the half shell 120. The secondary insulating body 176 can operate to create a thermal barrier that redirects the flow of heat toward the edges of the insulating body 176 and to regions of the insert 140 that are more capable of evenly-redistributing the heat to the half-shell.

In one aspect, the inner surface 178 of the secondary insulating body 176 may comprise a thermally-reflective surface or coating that further serves to redirect the flow of heat toward other regions of the insert 140. The reflective coating may comprise a non-conductive, low-emissivity material.

Figure 7:
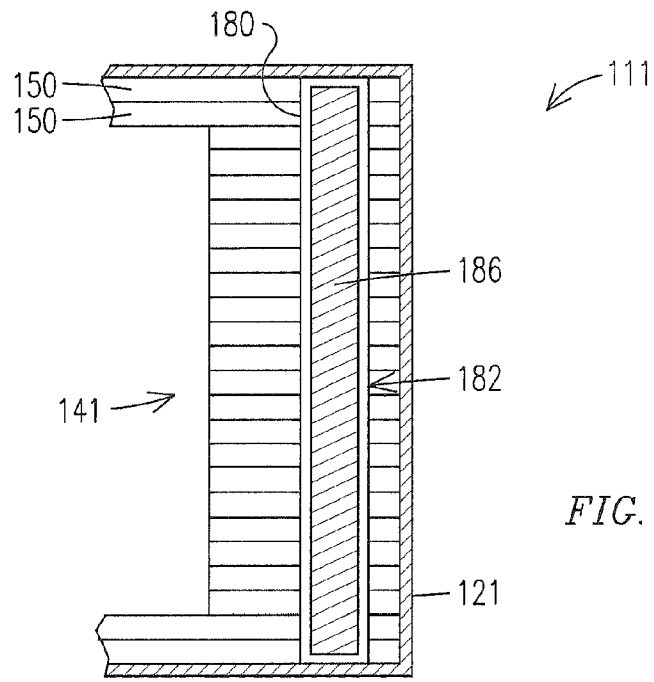
FIG. 7 is a partial cross-sectional side view of one of the half-shells, in accordance with yet another representative embodiment.

FIG. 7 is partial cross-sectional side view of an insert 141 and half-shell 121 of a container 111 in which apertures 180 have been formed into many, if not all, of the planar pieces 150 and aligned to form an alignment hole 182 that is sized and shaped to receive an alignment dowel or post 186. The alignment post 186 can be used to align the planar pieces as they are stacked during the building up of the insert 141 prior to installation within a half shell 121, and can generally be located toward an outer corner of the insert 141. In one aspect, the alignment post 186 can be mounted to an assembly fixture, and can remain with the assembly fixture after the built-up insert 141 has been removed, leaving the alignment hole 182 that may be left empty or filled with a secondary insulating body similar to that described above. In another aspect, the alignment post 186 can remain with the built-up insert 141 when it is removed from the assembly fixture and installed within the half shell 121.

Figure 8:
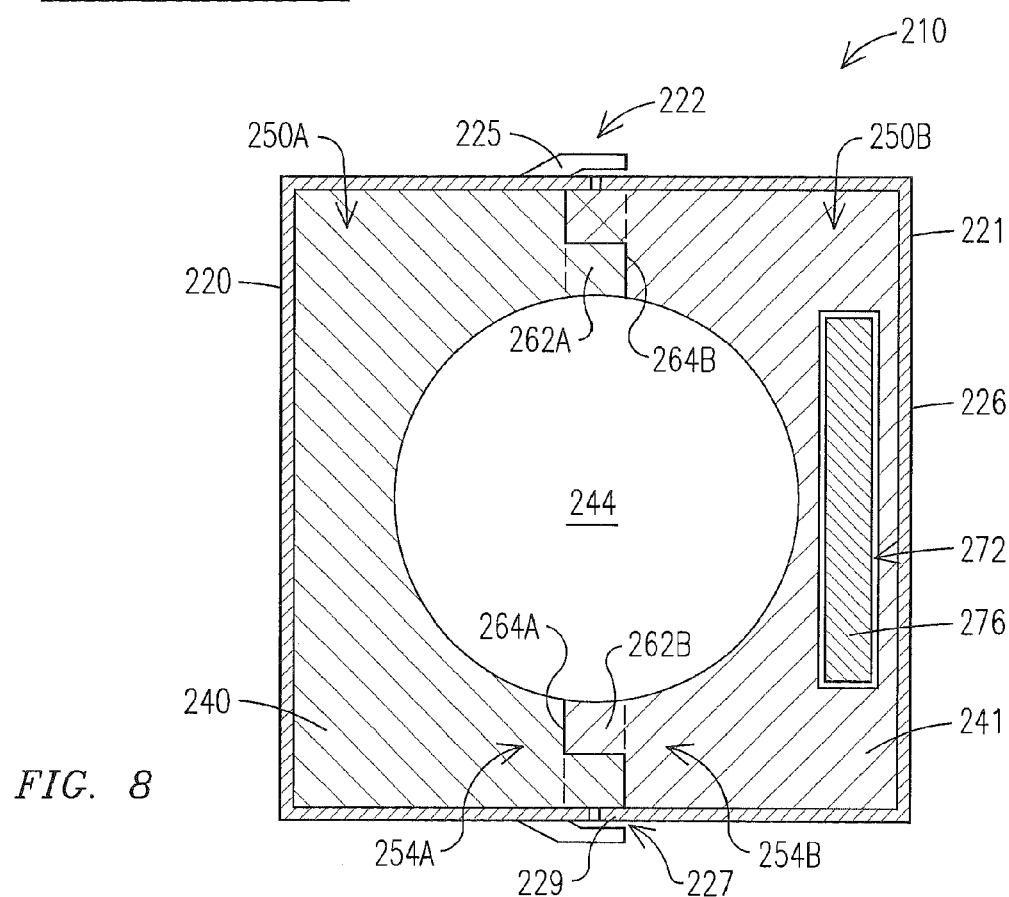
FIG. 8 is a cross-sectional top view of the assembled insulating container, in accordance with yet another representative embodiment.

FIG. 8 is a cross-sectional top view of the assembled insulating container 210, in accordance with yet another representative embodiment in which the two half-shells 220, 221 are coupled together about a circumferential seam 222 that passes through the vertical axis of the container 210. The seam 222 includes an outwardly-directed flange 225 proximate the edge of the first half-shell 220 defining a groove 227 that is configured to received the tongue portion 229 of the second half-shell 221. This tongue-in-groove relationship can restrict the flow of heat that would otherwise pass through the seam 222 between the half-shells 220, 221.

In one aspect, the tongue-in-groove relationship of the seam 222 can continue along the side edges of the planar pieces forming the inserts 240, 241. For instance, the side edges 254A of planar piece 250A that is included within insert 240 can include both protruding portions 262A and indented portions 264A configured to mate with respective indented portions 264B and protruding portions 262B formed into the side edges 254B of planar piece 250B that is included within insert 241. This can create a tortuous path that impedes the transfer of heat between the inner cavity 244 and the circumferential seam 222 along the interface between the two inserts 240, 241. In another aspect, moreover, the arrangement of the protruding portions and indented portions can alternate between planar pieces as they are stacked to form the inserts 240, 241, so as to create a tortuous path for restricting the transfer of heat that has been expanded into all three dimensions.

Also shown in FIG. 8 is another representation of a pocket cavity 272 and a secondary insulating body 276, which can be used to place an additional restriction on the flow of heat toward the outer surface 226 located on the side of the second half-shell 221.

Figure 9:
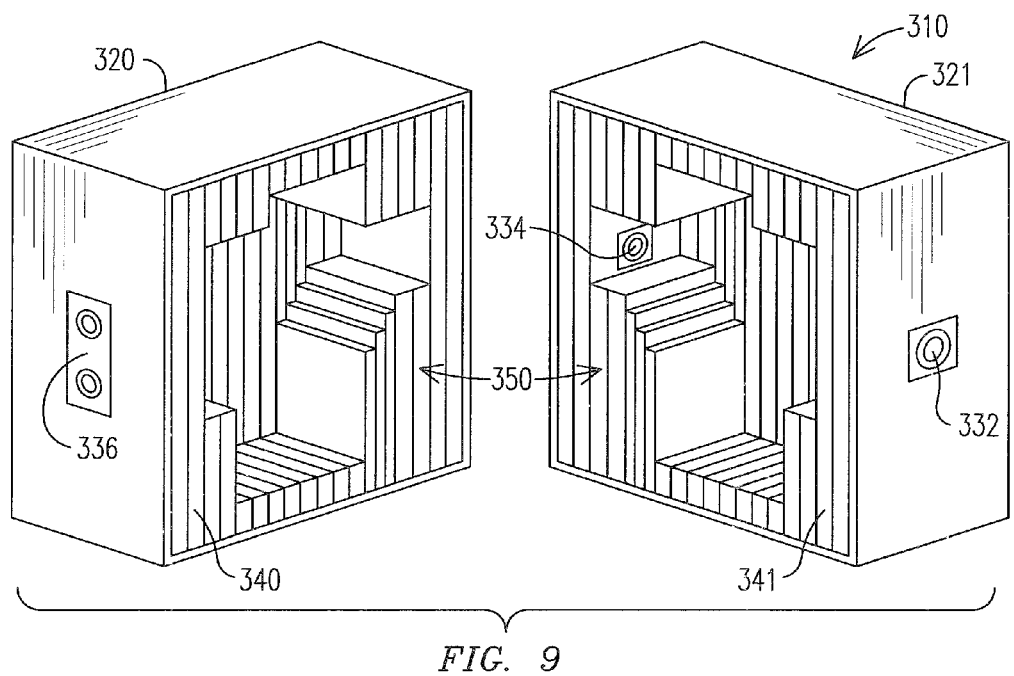
FIG. 9 is a perspective side view of an insulating container that includes two exterior half-shells with inserts formed from a plurality of built-up planar pieces, in accordance with yet another a representative embodiment.

FIG. 9 is a perspective side view of an embodiment of the insulating container 310 that includes two exterior half-shells 320, 321 with inserts 340, 341 formed from a plurality of built-up planar pieces 350 that are oriented vertically and built-up or stacked from end-to-end. In one aspect, the interface connectors, fittings or ports that allow for the various inputs and outputs to be connected to the hot object through the half-shells 320, 321 and insulating inserts 340, 341 (e.g. an inlet port 332, an outlet port 334 and electrical terminals 336, etc.) can be located on the end panels of the half-shells 320, 321, so that the penetrations for the various inputs and outputs may pass substantially perpendicular through the top and bottom faces of the planar pieces 350.

Figure 10:
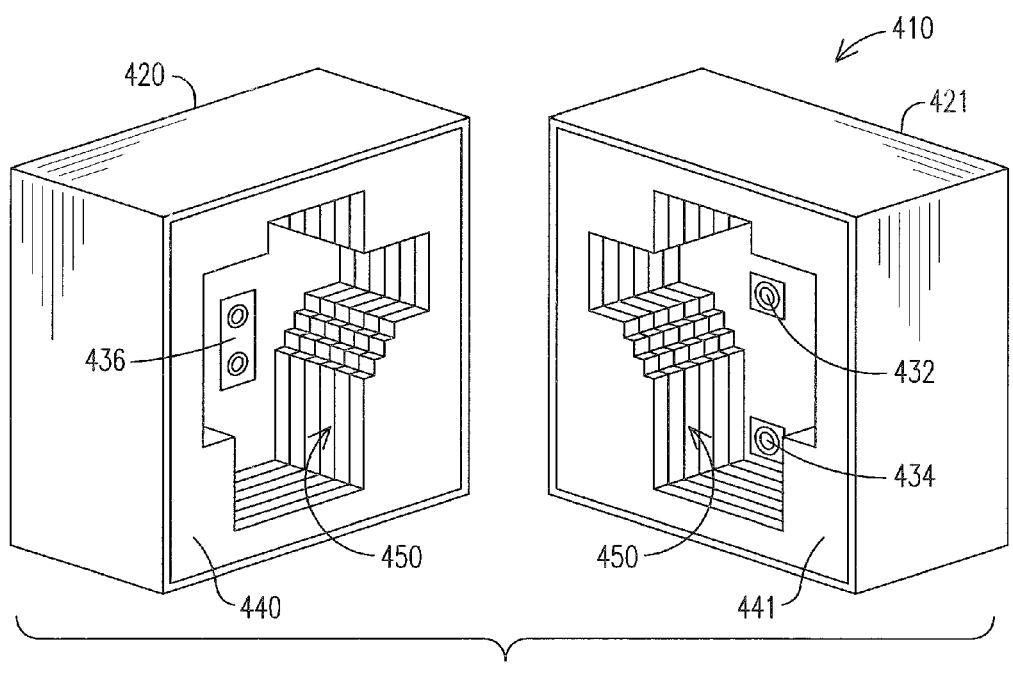
FIG. 10 is a perspective side view of an insulating container that includes two exterior half-shells with inserts formed from a plurality of built-up planar pieces, in accordance with yet another a representative embodiment.

FIG. 10 is a perspective side view of another embodiment of the insulating container 410 that includes two exterior half-shells 420, 421 with inserts 420, 421 formed from a plurality of built-up planar pieces 450 that are oriented vertically and built-up or stacked from side-to-side, rather than end-to-end or top-to-bottom, as described above. In one aspect, the interface connectors, fittings or ports that allow for the various inputs and outputs to be connected to the hot object through the half-shells 420, 421 and insulating inserts 440, 441 (e.g. an inlet port 432, an outlet port 434 and electrical terminals 436, etc.) can be located on the side panels of the half-shells 420, 421 so that the penetrations for the various inputs and outputs may also pass substantially perpendicular through the top and bottom faces of the planar pieces 450.

The invention has been described in terms of preferred embodiments and methodologies considered by the inventors to represent the best mode of carrying out the invention. A wide variety of additions, deletions, and modification might well be made to the illustrated embodiments by skilled artisans within the scope of the invention. For example, it is to be appreciated that the overall size and shape of the insulating container defined by the half-shells, as well as the irregular shape and structure of the inner cavities defined therein by the inner surfaces of the inserts, are merely representative of a container and cavity that has been configured to receive and enclose a hot object having an irregular shape and structure, and that many other shapes and configurations for the half-shells and the inner cavity are both possible and expected. These and other revisions might be made by those of skill in the art without departing from the spirit and scope of the invention, with is constrained only by the following claims.

What is claimed is:

1. An insulating container for controlling the transfer of heat from a hot object contained therein, the insulating container comprising:
    a first half-shell;
    a second half-shell configured to couple together with the first half-shell to form a sealed enclosure;
    a first insert sized and shaped to be received within the first half-shell and having a first inner surface shaped to conform around a first portion of the hot object; and
    a second insert sized and shaped to be received within the second half-shell and having a second inner surface shaped to conform to a second portion of the hot object, the first inner surface and the second inner surface surrounding and substantially conforming to the hot object enclosed within the sealed enclosure,
    wherein the first insert and the second insert are built up from a plurality of planar pieces of insulating material.

2. The insulating container of claim 1, wherein at least one of the planar pieces includes an inner edge forming a portion of one of the first inner surface and the second inner surface, the inner edge being substantially perpendicular to the top and bottom surfaces of the planar piece.

3. The insulating container of claim 2, wherein the inner edge has a shaped profile that is different from a second inner edge of an adjacent planar piece, and with the inner edge and the second inner edge together defining a stepped contour in one of the first inner surface and the second inner surface.

4. The insulating container of claim 1, wherein each of the planar pieces is substantially planar in cross-section along two orthogonal axes.

5. The insulating container of claim 1, wherein each of the planar pieces has a substantially constant thickness ranging from about ⅛ inch to about ½ inch.

6. The insulating container of claim 1, wherein the first half shell and the second half shell are coupled together around circumferential seam.

7. The insulating container of claim 6, wherein an orientation of the built-up planar pieces is perpendicular to the plane of the circumferential seam.

8. The insulating container of claim 6, wherein an orientation of the built-up planar pieces is parallel to the plane of the circumferential seam.

9. The insulating container of claim 1, wherein the built-up planar pieces are adhered to one another.

10. The insulating container of claim 9, further comprising at least one adhesive strip between each of the planar pieces and proximate the outer edges thereof.

11. The insulating container of claim 10, wherein the at least one adhesive strip has a thickness sufficient to separate the planar pieces and form an air gap proximate the inner edges thereof.

12. The insulating container of claim 10, wherein the adhesive strip is a high-temperature tape.

13. The insulating container of claim 10, wherein the adhesive strip is a cured high-temperature adhesive fluid.

14. The insulating container of claim 1, further comprising a plurality of apertures formed into the plurality of built-up planar pieces, the plurality of apertures being aligned to form at least one hollow within at least one of the first insert and the second insert.

15. The insulating container of claim 14, wherein the at least one hollow further comprises a registering hole extending through the first insert or the second insert for receiving a registering post used to align the plurality of built-up planar pieces during assembly.

16. The insulating container of claim 14, wherein the at least one hollow further comprises a pocket cavity sized and shaped to receive a secondary insulating body.

17. The insulating container of claim 16, wherein the secondary insulating body comprises an aerogel insulating material.

18. A method of making an insulating container for controlling the transfer of heat from a hot object contained therein, the method comprising:
    obtaining a first half-shell and a second half-shell;
    obtaining a substantially planar sheet of insulating material;
    forming a plurality of planar pieces from the substantially planar sheet, each of the planar pieces having an outer edge sized and shaped to fit within one of the first half shell and the second half shell, the planar pieces including a plurality of inner edges;
    building up the plurality of planar pieces to form a first insert and a second insert sized and shaped to be received within the first half-shell and the second half shell, respectively, each of the first insert and the second insert having an inner surface defined by the plurality of inner edges and shaped to conform around the hot object;
    installing the first insert within the first half-shell;
    installing the second insert within the second half-shell; and
    coupling together the first half-shell and the second half-shell to form a sealed enclosure configured to surround and substantially conform to the hot object enclosed within the sealed enclosure.

19. The method of claim 18, wherein the inner edges are substantially perpendicular to the top and bottom surfaces of the planar piece.

20. The method of claim 18, further comprising applying an adhesive strip between each of the planar pieces and proximate the outer edges thereof.

* * * * *